United States Patent
Stine et al.

(10) Patent No.: US 10,395,317 B2
(45) Date of Patent: Aug. 27, 2019

(54) METHOD FOR INTERMEDIATING NETWORK COMMUNICATIONS BETWEEN USER DEVICE AND DESTINATION SYSTEM

(75) Inventors: Ted Stine, Suwanee, GA (US); Joseph Anthony Speeney, Basking Ridge, NJ (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 554 days.

(21) Appl. No.: 13/315,711

(22) Filed: Dec. 9, 2011

(65) Prior Publication Data
US 2013/0151409 A1  Jun. 13, 2013

(51) Int. Cl.
*G06Q 40/06* (2012.01)
*H04L 29/06* (2006.01)
*H04L 9/08* (2006.01)

(52) U.S. Cl.
CPC .............. *G06Q 40/06* (2013.01); *H04L 9/085* (2013.01); *H04L 63/0428* (2013.01)

(58) Field of Classification Search
CPC .... G06Q 20/00; G06Q 40/06; H04L 63/0428; H04L 9/085
See application file for complete search history.

(56) References Cited

U.S. PATENT DOCUMENTS

| | | | |
|---|---|---|---|
| 7,215,755 B2 | 5/2007 | Novack | |
| 7,317,792 B2 | 1/2008 | Novack | |
| 7,502,760 B1* | 3/2009 | Gupta | G06Q 20/367 705/64 |
| 7,526,080 B2 | 4/2009 | Novack | |
| 7,742,994 B1* | 6/2010 | Gupta | 705/64 |
| 7,792,270 B2 | 9/2010 | Novack | |
| 7,945,040 B2* | 5/2011 | Novack | H04M 3/4228 379/207.01 |
| 2003/0004792 A1* | 1/2003 | Townzen et al. | 705/13 |
| 2004/0215766 A1* | 10/2004 | Haddad | H04L 47/11 709/224 |
| 2005/0240432 A1* | 10/2005 | Jensen | 705/1 |
| 2006/0041505 A1* | 2/2006 | Enyart | 705/40 |
| 2009/0240565 A1* | 9/2009 | Calonge | G06Q 20/102 705/307 |

* cited by examiner

Primary Examiner — Scott S Trotter
(74) Attorney, Agent, or Firm — Greenblum & Bernstein, P.L.C.

(57) ABSTRACT

A method for intermediating communications with an automated system includes receiving, at an intermediating device that implements an intermediating communication application, an instruction to complete a transaction request on behalf of a user. The method also includes determining, by the intermediating communication application on the intermediating device, a destination system from which to request completion of the transaction request. The method additionally includes interacting, by the intermediating device, with the destination system to fulfill the transaction request.

16 Claims, 12 Drawing Sheets

Tablet 810

Figure 11

Tablet 810

Screen 815

CUSTOMER SERVICE 4.0   Welcome Alex Bell

Home – 123 Main Street              Joan [Portrait/Icon/Photo]
Phone  <----------------             Approximate wait time: 5 mins
                                     Customer Rating ****
Service                              Joan answered your DSL call 3 weeks ago
    No Dial Tone <--------
    Static on line                   Analyzing your service while waiting for Joan
    Billing
    Change plan                      We tested your line and confirmed that there
    Question about bill              is a trouble. We will send a technician. We see
Add service                          that you do not have inside wiring coverage. If
    Add a new line                   there is a problem with your inside wiring, do you
    Add an extension                 agree to pay $50 extra?

Please Select a Service Appointment Time:
☐ Today between 3:00 and 4:30      ☐ Today between 4:00 and 5:30
          ☐ Tomorrow between 8:00 and 9:30

Chat with Joan:
    Joan: Hello Mr. Bell - I'm happy to help you again – be with you shortly.
    Alex Bell:

METHOD FOR INTERMEDIATING NETWORK COMMUNICATIONS BETWEEN USER DEVICE AND DESTINATION SYSTEM

BACKGROUND

1. Field of the Disclosure

The present disclosure relates to interactive transactions. More particularly, the present disclosure relates to automating interactive transactions for parties initiating the transactions across communications networks.

2. Background Information

Parties determine addresses of destination interactive systems and select or input the addresses to initiate communications with the destination interactive systems. Parties then provide input responsive to prompts to interact with the destination interactive systems and complete a transaction.

BRIEF DESCRIPTION OF THE DRAWINGS

FIG. 11 shows the exemplary tablet and another screen for a automating interactive transactions, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Automating interactive transactions as described herein provides for interactive assistance applications installed on and executed by user devices to initiate communications and interact with remote agents across a network. Interactions to complete transactions may be performed between an interactive human agent and an interactive assistance application on a user device, or between an interactive agent application and an interactive assistance application on a user device. Computers that carry the interactive assistance applications and the interactive agent applications therefore operate as interactive systems. Examples of user devices include mobile tablet computers, multi-modal smart phones, desktop computers and laptop computers. Examples of interactive agent systems include servers such as web servers and interactive voice response systems.

Interactive systems interact in accordance with scripts and preprogrammed logic to execute instructions initially originated by parties as input to the user devices, and the networked interactive agent systems may be integrated with other systems to fulfill the instructions and complete transaction requests on behalf of the parties. The interactive agent systems may provide information over the telecommunications networks and/or Internet for audible or visual representation to the user. The interactive assistance applications analyze the information from the interactive agent systems, and provide requested information to the interactive agent systems without necessarily requiring specific input from the users during the communication. Therefore, a user can activate an interactive assistance application and request a transaction that the interactive assistance application then completes at least to the point where a proposal for a complete transaction can be presented to the user for approval/authorization.

Figure 1:
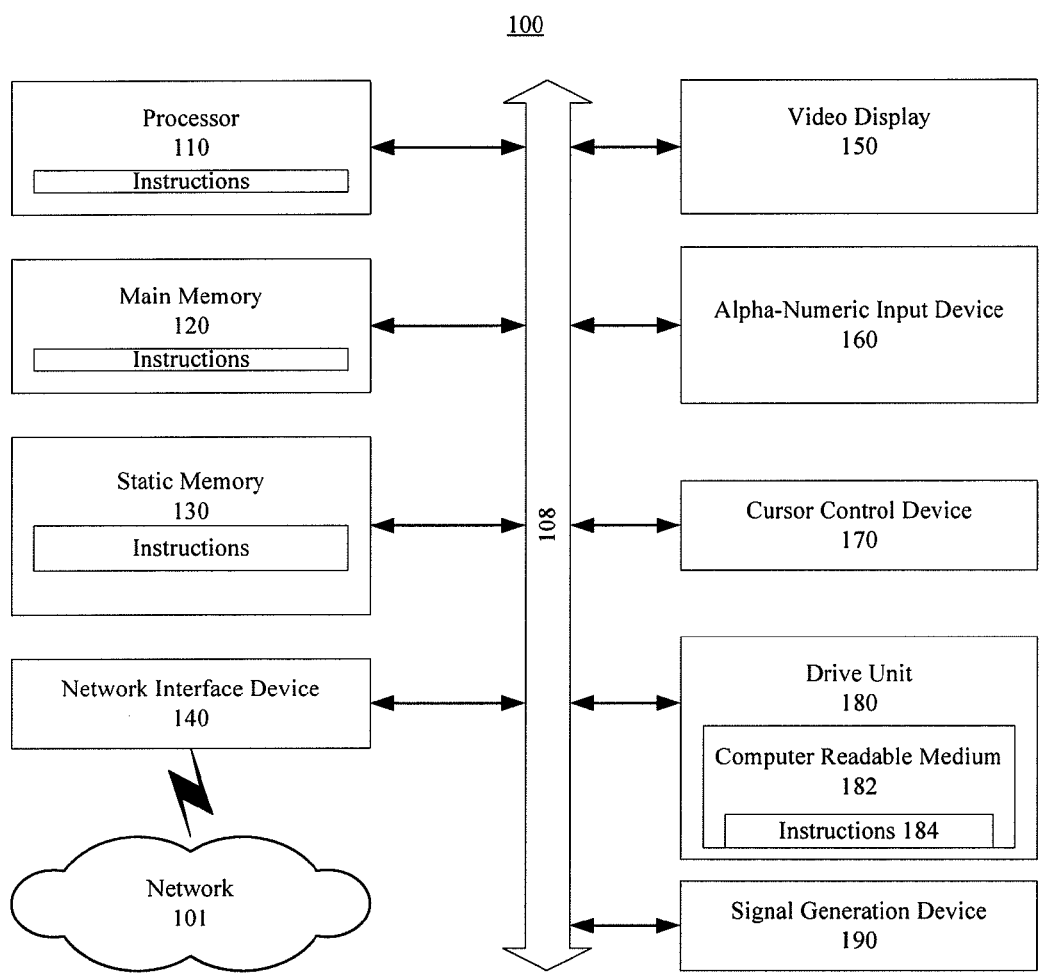
FIG. 1 shows an exemplary general computer system that includes a set of instructions for automating interactive transactions, according to an aspect of the present disclosure.

FIG. 1 is an illustrative embodiment of a general computer system, on which a method of automating interactive transactions can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a desktop computer, a server computer, a tablet personal computer (PC), a personal digital assistant (PDA), a mobile device, a global positioning satellite (GPS) device, a palmtop computer, a laptop computer, a communications device, a wireless telephone, a control system, a personal trusted device, a web appliance, a network router, switch or bridge, an interactive system computer, an environmental coordination computer, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
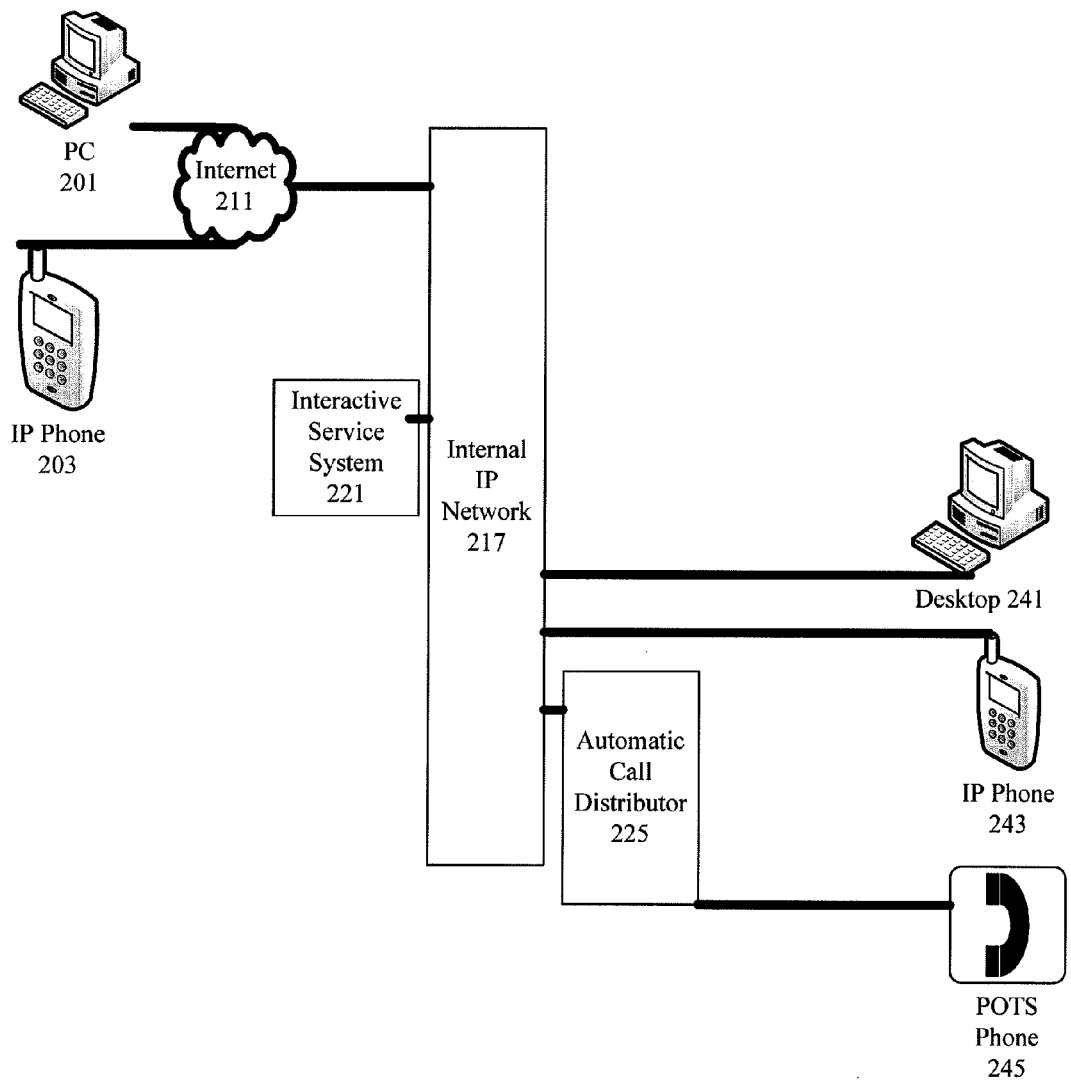
FIG. 2 shows an exemplary network for automating interactive transactions, according to an aspect of the present disclosure.

FIG. 2 shows an exemplary network for automating interactive transactions, according to an aspect of the present disclosure. In FIG. 2, user devices include personal computer (PC) 201 and internet protocol (IP) phone 203. The user devices each communicate across the Internet 211 and an internal IP network 217 with interactive agents on or using an interactive service system 221, a desktop computer 241, an IP phone 243, or a plain old telephone system (POTS) phone 245. The agents may be human or non-human agents that provide services. The POTS phone 245 in FIG. 2 is merely representative of legacy telephones used by human agents that are assigned calls via an automatic call distributor 225. Similarly, the desktop 241 and IP phone 243 in FIG. 2 are merely representative of computers and communications devices used by human agents that are assigned communications such as chat sessions or emails. On the other hand, interactive service system 221 is an automated interactive agent system that carries and executes an agent application to interact with user devices such as PC 201 and IP phone 203.

As described herein, user devices and, in some but not all instances, agent devices, can initiate communications and interact without human instructions during the communications. Parties may initially instruct the user devices to initiate and complete a transaction, and applications on the user devices then determine where and how to complete the transaction without human instructions during the communications. The user devices initiate a communication and interact with human or non-human agents to request the transactions, provide information to the human or non-human agents, and complete the transactions. The user devices may ultimately present one or more proposed completed transactions to the requesting party for final authorization.

An example of automating interactive transactions using the network of FIG. 2 begins with a party activating an interactive assistance application on the PC 201 or IP phone 203. The interactive assistance application may be a general purpose application, or an assistance application specific to a single entity such as a communications service provider or financial institution such as an online discount broker. The user provides an instruction to the interactive assistance application by, for example, speaking or typing an instruction to complete a transaction. An example of a transaction might be "transfer fifty dollars from my trading account at bank X to my checking account at bank Y". The application then determines the user's account information for the trading account at bank X from data stored on the user device or in another user device on a local network of the user. The application also determines an address such as a telephone number or website of the interactive service system 221, and initiates a communication to the determined address. The address may be determined from previous communications for similar transactions by the interactive assistance application, or the interactive assistance application may seek an address for bank X from another source.

When the interactive service system 221 answers or otherwise responds, the interactive assistance application on the user device interacts with the interactive service system 221 to complete the transaction in the same manner as if the user was interacting but without requiring user input during the communication at least until a proposed completed transaction is prepared for review. For example, the interactive service system 221 may be a web server that provides a webpage, and the interactive assistance application may log in to the user's account at bank X using the user's username and password for bank X. Afterwards, the interactive assistance application uses logic to search for a selectable link to "transfer" funds, and then provides information to specify the transfer amount and destination in accordance with the instruction from the party. In some embodiments, the transaction may be completed by the interactive assistance application without requiring even a review by or approval of the user. The interactive assistance application may provide dual-tone multi-frequency tones, chat text, verbal instructions and information in English, or other forms of information to interact with the interactive service system 221. The interactive assistance application on the user device may also interact with a human agent using an IP phone 243 or desktop 241, in a reversal of the conventional role of human callers interacting with automated agent systems.

Figure 3:
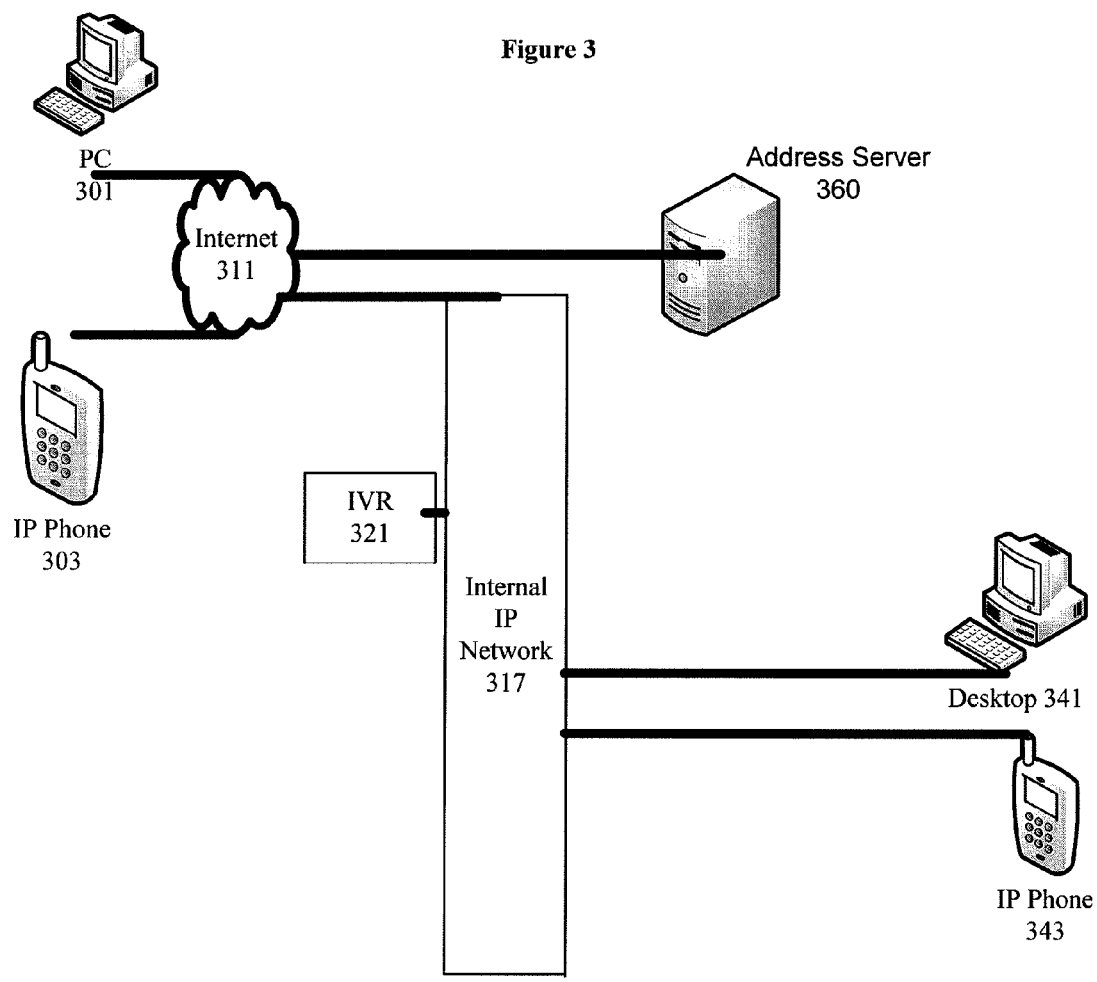
FIG. 3 shows another exemplary network for automating interactive transactions, according to an aspect of the present disclosure.

FIG. 3 shows another exemplary network for automating interactive transactions, according to an aspect of the present disclosure. In FIG. 3, a PC 301 and IP phone 303 communicate with human and non-human agents and agent devices across the internet 311 and an internal IP network 317. The agents and agent devices include an interactive voice response (IVR) system 321, a desktop 341 and IP phone 343. In the embodiment of FIG. 3, an address server 360 provides an assistance service to the automated interactive assistance applications on the PC 301 and IP phone 303, so that the automated interactive assistance applications can find a proper destination to fulfill party requests for transactions. The applications on the PC 301 or IP phone 303 initiate a request across the internet to address server 360 for the address to contact for a particular type of transaction. The automated interactive assistance application on PC 301 or IP phone 303 may send party or device or network profile data that helps the address server determine the address to contact for a particular type of transaction. The party profile data may include a user name or demographic information. The device profile data may include a device type or device capabilities or characteristics, as well as applications installed on the device. Network profile data may include communications modes supported by the network and bandwidth capabilities of the network.

As an example, a party may activate an assistance application on IP phone 303 and instruct the assistance application with keyboard or keypad input to find and purchase a new music album from an artist. The assistance application may identify a music application on the IP phone 303 that stores and plays music for the party, and request an address of the music source for the application from address server 360. The IP phone 303 sends the identification of the music application as well as the device type of the IP phone 303 to the address server 360, and the address server 360 identifies an online music "store" for the music application based on the identification of the music application and/or type of the IP phone 303. The IP phone 303 receives the address and then contacts the music store at the address, and requests the newest music album from the artist named by the party. The IP phone 303 provides any requested payment information, such as a payment account and confirmation number, a zip code of the party, a name of the party on the account, and any other information traditionally provided by human parties to complete transactions. The IP phone may, at any time, provide transaction information to the party via a visual or audio interface and request confirmation of the accuracy of the transaction. Requested confirmation may include identification of an artist, an album, a release date, a set of songs on the album, an album cover, a sample of a song in the album, and any other information that may help a party identify and confirm the accuracy of a transaction. Whether or not confirmation of the transaction is sought from the party, the transaction application on the IP phone 303 can complete the transaction without a further affirmative instruction from the party after the initial instruction to find and purchase the new music album from the artist.

As described herein, interactions can be provided by the automated interactive assistance application via a visual interface. Therefore, selectable options from an interactive agent platform such as a webserver can be provided via the visual interface on the user device. In the example of a dedicated interactive assistance application on a user device, the user may activate the application and provide information about a problem or an area of a sales interest and allow the automated interactive assistance application to resolve the problem or initiate and complete a transaction. A dedicated interactive assistance application may also allow a user to pre-populate information typically required in interactive communication sessions, such as language preference, account numbers or birth dates. In an embodiment described below, the visual interface may also be provided to allow the automated interactive assistance application to select an "agent" to handle the communication. The agent system may not be aware that the user is having an automated interactive assistance application handle the transaction without affirmative user input during the interactions until at least a proposal to complete the transaction is ready for review.

In other embodiments, an automated interactive assistance application for a single entity such as a financial institution or communications service provider may visually present an initial input menu to the user, and then negotiate with an agent system over a network to complete a transaction based on the initial set of information provided by the party. Such a dedicated application may require the user to log in with a username and password, and then accept a free form text or speech query to form an input query. A search algorithm then applied to the free form input text or speech to determine the most likely solution to the query. A completed transaction proposal can then be presented to the party via the user device. In one embodiment, the party may be presented an option to have an agent contact the party at a specified time via a specified communications mode such as phone call or text message or chat.

Figure 4:
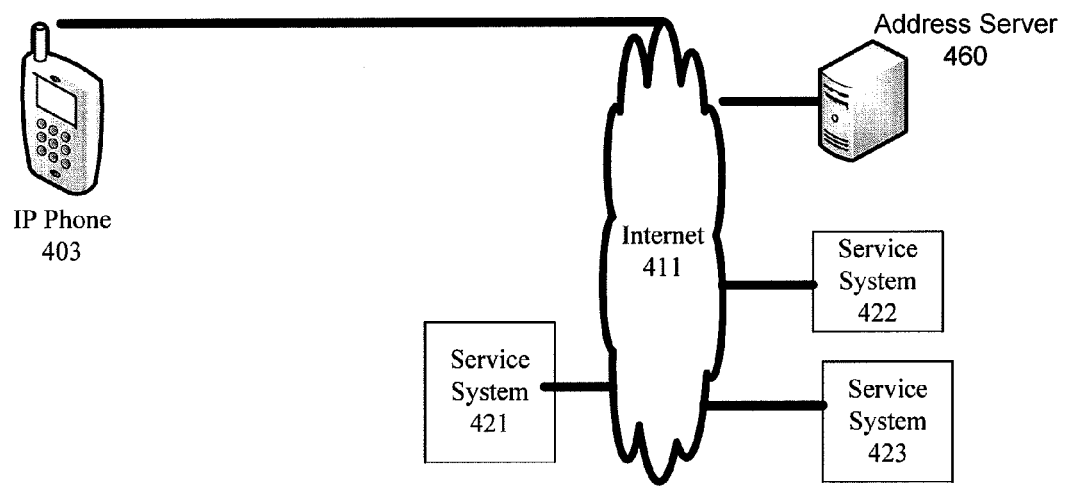
FIG. 4 shows another exemplary network for automating interactive transactions, according to an aspect of the present disclosure.

FIG. 4 shows another exemplary network for automating interactive transactions, according to an aspect of the present disclosure. In FIG. 4, multiple service systems 421, 422 and 423 are reachable by an IP phone 403 over the internet 411. An address server 460 is available as an assistance system for the IP phone 403 to look up the address of an appropriate service system to fulfill a transaction request.

The IP phone 403 is analogous to a tablet computer, a laptop computer, a cell phone, or any other device that communicates with an interactive system over a communications network. However, the IP phone 403 and any analogous computer or other device according to the present disclosure processes an application that takes an initial instruction for a transaction from an initiating party, and automates the process of conducting the transaction. The IP phone or analogous computer or other device therefore performs one or more of the following acts without any subsequent instruction from the party initiating the transaction:

finding an address to contact across a communications network initiating a communication to an agent at the address across the communications network interacting with the agent at the address across the communications network to request and complete the transaction determining a form of payment, if payment is required forwarding requested information to the agent at the address across the communications network preparing a presentation of a proposed complete transaction presenting the proposed complete transaction to the initiating party for authorization The service systems 421, 422, 423 may be websites such as financial websites, shopping websites, utility websites, information websites, news websites, or other forms of websites configured to interact with users across the Internet. The service systems 421, 422, 423 are also analogous to interactive voice response systems or other systems that are configured to interact with users across a telephony network. Accordingly, any device configured to perform activities commensurate in scope with the activities of users devices described herein falls within the scope of the present disclosure.

Figure 5:
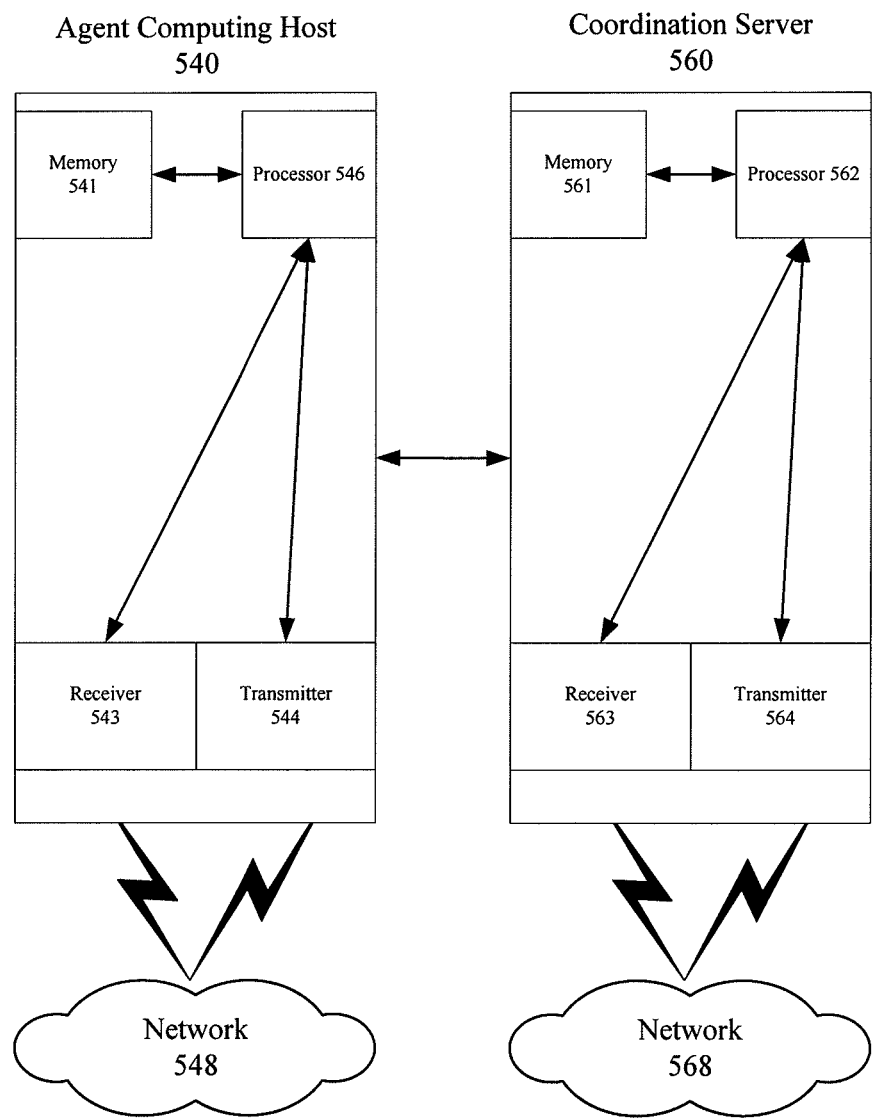
FIG. 5 shows another exemplary network that includes an agent computing host and a coordination server for automating interactive transactions, according to an aspect of the present disclosure.

FIG. 5 shows another exemplary network that includes an agent computing host and a coordination server for automating interactive transactions, according to an aspect of the present disclosure. FIG. 5 shows an exemplary agent computing host 540 and an exemplary coordination server 560 for accessible and updateable service records. In FIG. 5, agent computing host 540 includes a memory 541, a processor 546, a receiver 543 and a transmitter 544. The receiver 543 and transmitter 544 communicate over network 548. The processor 546 processes instructions and data from the receiver 543 and memory 541, and forwards instructions or data to transmitter 544 for transmission or to memory 541 for storage. In FIG. 5, coordination server 560 includes a memory 561, a processor 562, a receiver 563 and a transmitter 564. The receiver 563 and transmitter 564 communicate over network 568. The processor 562 processes instructions and data from the receiver 563 and memory 561, and forwards instructions or data to transmitter 564 for transmission or to memory 561 for storage.

The agent computing host 540 may be an automated agent or device used by a human agent as described herein. The agent computing host 540 and coordination server 560 communicate with each other in the embodiment of FIG. 5. The servers may communicate over a communications network, or may alternatively be implemented on the same physical computer. The coordination server 560 may coordinate the activities of an agent computing host 540 by, for example, interpreting requests and instructions received by agent computing host 540 from user devices into data instructions understandable by agent computing host 540. In this regard, when agent computing host 540 receives communications and signals that are not understood from a user device, the coordination server 560 may analyze and translate the communications and signals for the agent computing host 540.

Figure 6:
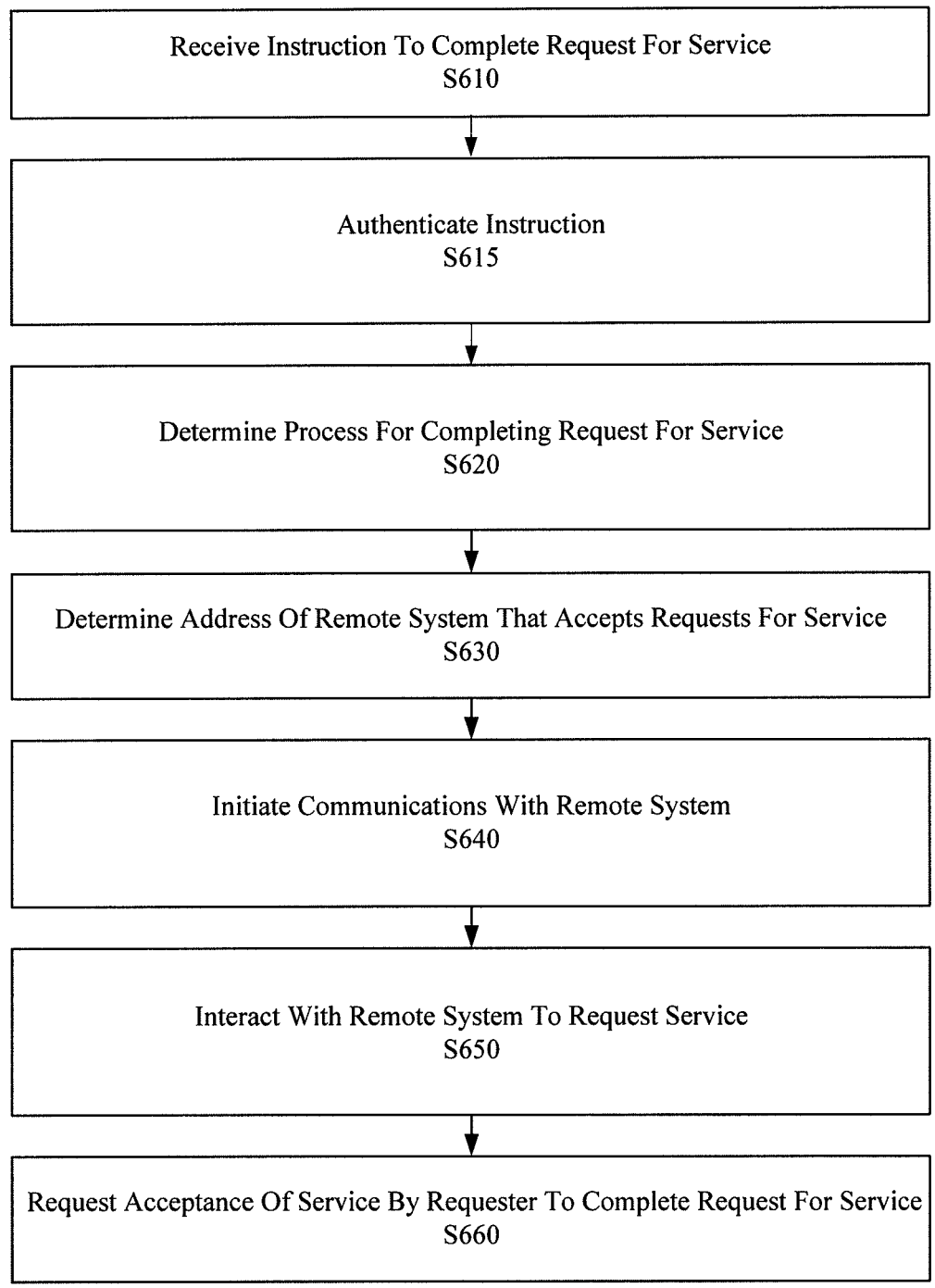
FIG. 6 shows an exemplary process for automating interactive transactions, according to an aspect of the present disclosure.

FIG. 6 shows an exemplary process for automating interactive transactions, according to an aspect of the present disclosure. At S610, an instruction to complete a request for service is received by a user device from a party. The instruction may be received by a voice command, a keyboard or keypad command, a touchscreen selection, or a dedicated of multi-function button selection. At S615, the user device authenticates the instruction by, e.g., requesting a password from the party, so as to verify the authorization to perform the transaction. At S620, the user device determines a process for completing the request for service. The user device may, for example, determine a need to contact a bank website or interactive voice response system, or a need to log in to a trading website. At S630, the user device determines an address of a remote system that accepts requests for service of the type requested by the party. The user device may, for example, contact an address server and profile party and/or device profile information to determine the proper address to contact to fulfill the transaction. The user device may also already have an appropriate address for fulfilling the transaction, such as when the party directly provides the destination address or when the user device has performed similar transactions in the past.

At S640, the user device initiates communications with the remote system, such as by inputting an address of the remote system into a browser or as a telephone number input into a dual-tone multi-function keypad of a user device and pressing a "send" button or soft key or icon. At S650, the remote interactive system is reached and the user device begins to interact with the remote system to request service. For example, the user device may receive requests for information or menu selections from an interactive voice response system, and provide dual-tone multi-function responses to select from the menu or provide requested information. At S660, acceptance of the service is requested from the requester, so as to complete the request for service. In this regard, a visual screen as described below may be presented to a party to confirm acceptance of a proposed transaction completion. Acceptance of the proposed transaction is then conveyed and the transaction is completed.

In the embodiment of FIG. 6, a dedicated assistance application on the user device may be activated in order to complete a transaction. The dedicated application may be an assistance application provided for assistance with a single entity, such as an online provider of goods. The assistance application may store profile data of the party and history information of previous communications, so that known preferences of the party can be accommodated. The known preferences may include agents approved and disapproved by the party in previous communications sessions. The assistance application may also be linked to other applications of the party, such as social networking applications.

Figure 7:
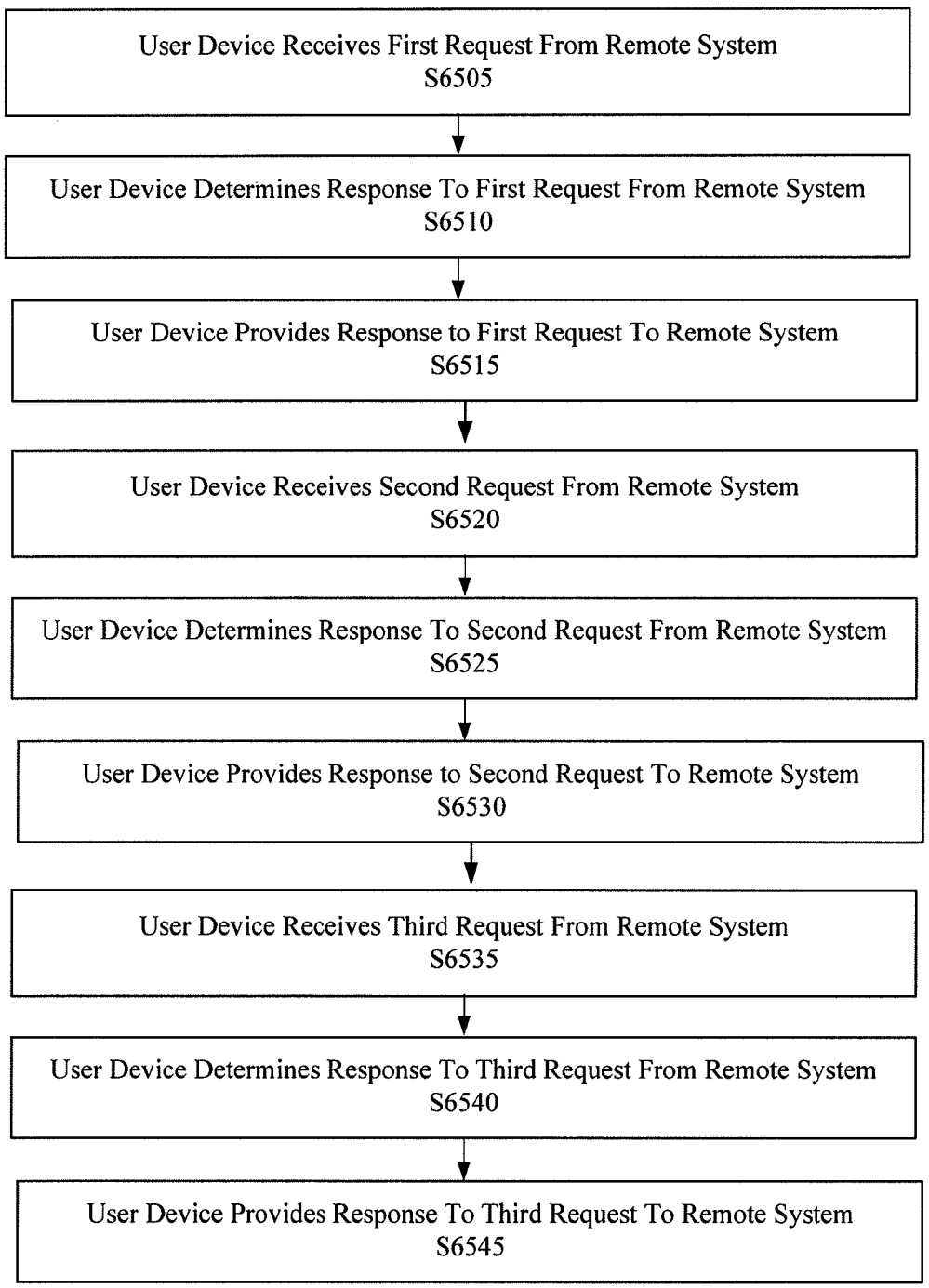
FIG. 7 shows another exemplary process for automating interactive transactions, according to an aspect of the present disclosure.

FIG. 7 shows another exemplary process for automating interactive transactions, according to an aspect of the present disclosure. The embodiment of FIG. 7 illustrates interaction of the sort performed in S650 of FIG. 6. At S6505 a user device receives a first request from a remote system. At S6510, a user device determines a response to the first request from the remote system, and at S6515, the user device provides the response to the first request to the remote system. At S6520, the user device receives a second request from the remote system. At S6525, the user device determines a response to the second request from the remote system, and at S6530, the user device provides the response to the second request to the remote system. At S6535, the user device receives a third request from the remote system. At S6540, the user device determines a response to the third request from the remote system, and at S6545, the user device provides the response to the third request to the remote system.

The embodiment of FIG. 7 illustrates that interactive systems and activities include actual interactions such as generating requests, analyzing received requests, generating a response, and sending the response. After a communication is initiated, such interactions in the present disclosure may be performed between devices without further instructions from the initiating party and/or without instructions from a human agent on the agent side of the communication.

In the embodiments where the automated assistance application is provided by and for a single entity, the assistance application may coordinate transactions between the party and the entity in advance. As an example, the assistance application may schedule an automated order for a next version of a smart phone on which the assistance application is installed. The assistance application may also coordinate with other applications such as electronic calendars, to propose calendar appointments and meetings when a transaction will require the party to attend a meeting. A calendar appointment may be proposed for a service appointment, or a call back time from a human agent that must speak with the party, or other forms of appointments. The proposed appointment dates and times may be presented to the party for approval of the party, so that the interactive assistance application invokes other applications such as the calendar on the user device in order to propose a completed transaction. The automated assistance application may also interoperate with a near field communications (NFC) chip on a user device to prepopulate known information from the near field communications chip to the automated interactive assistance interface on the user device.

In an embodiment, a user device may have multiple distinct assistance applications for multiple distinct entities. Therefore, a user may activate an appropriate assistance application when the user wants to request a transaction with the entity that provides the application. In another embodiment, a general purpose assistance application on a user device may interoperate with an assistance application for a single entity, so that the general purpose assistance application provides requested information to the dedicated assistance application so that the dedicated assistance application can communicate with the remote agent or agent application. In this way, an entity can minimize the amount of unnecessary information carried across a network by providing an assistance application to the user device to assist a general purpose assistance application in determining how to complete a transaction for a user.

Figure 8:
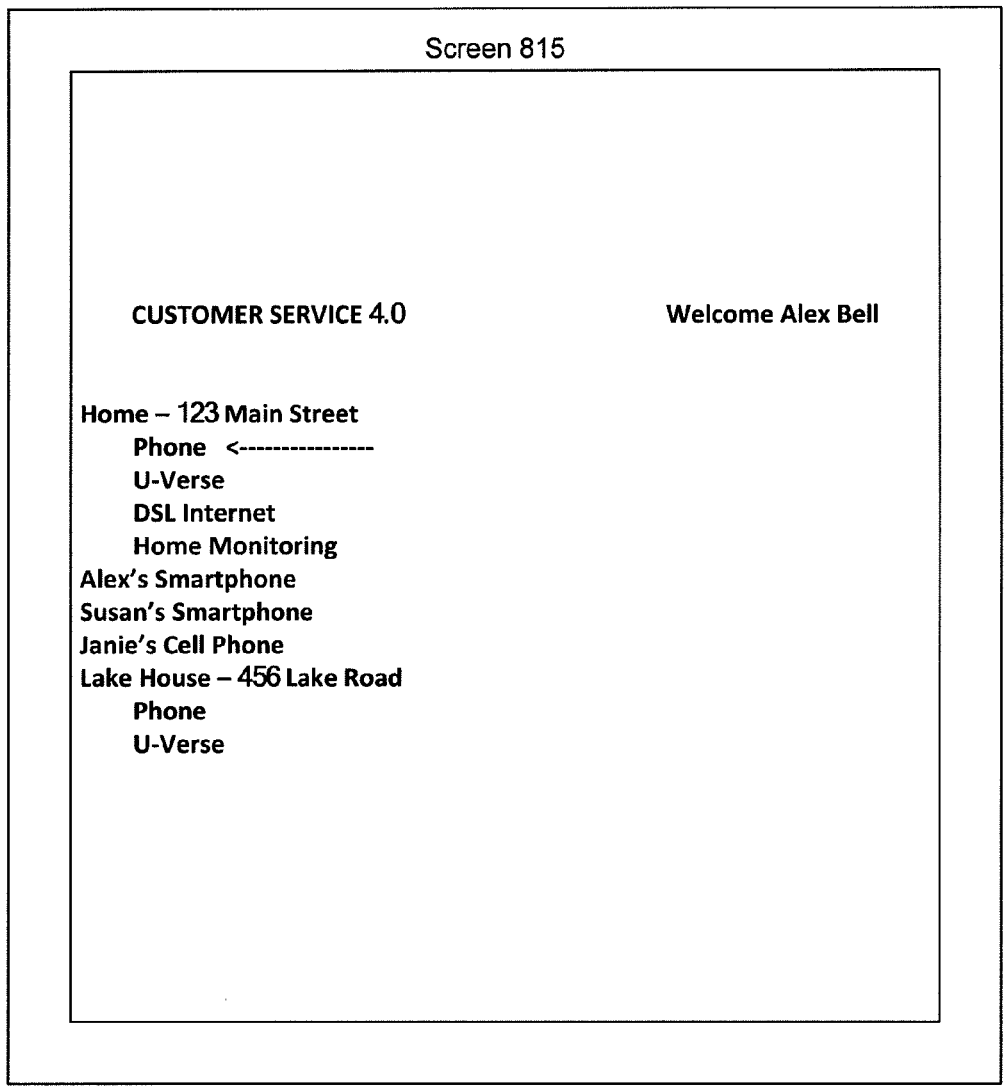
FIG. 8 shows an exemplary tablet and screen for automating interactive transactions, according to an aspect of the present disclosure.

FIG. 8 shows an exemplary tablet and screen for automating interactive transactions, according to an aspect of the present disclosure. In FIG. 8, a tablet computer 810 is a user device with a screen 815. When a customer activates an assistance application on the tablet 810, the user is presented with information from an interactive application provided by a communications service provider. The user may activate the assistance application by touching a touchscreen icon on the tablet computer 810 to generate the assistance application, and then inputting an instruction by voice or touchscreen keypad to conduct a transaction. The assistance application may be a dedicated assistance application from the communications service provider, so that an address of an interactive agent system need not be retrieved from a remote assistance system because the dedicated assistance application already possesses addresses of the interactive agent system. Alternatively, the assistance application may be a general purpose assistance application that interprets party instructions, finds addresses, initiates communications and interacts with remote interactive agents.

In the embodiment of FIG. 8, a general purpose assistance application is activated by a party "Alexander Bell" attempting to obtain assistance for a non-functioning home phone with no dial tone. For example, Alexander Bell activates the application and speaks an instruction to call for service for a landline phone with no dial tone. The general purpose assistance application contacts a website of a communications service provider for Alexander Bell's landline phone, and is presented with an introductory customer service webpage shown on the screen 815. The assistance application analyzes the content of the webpage on the screen 815, and selects a selectable option for "phone" as shown in FIG. 8.

Figure 9:
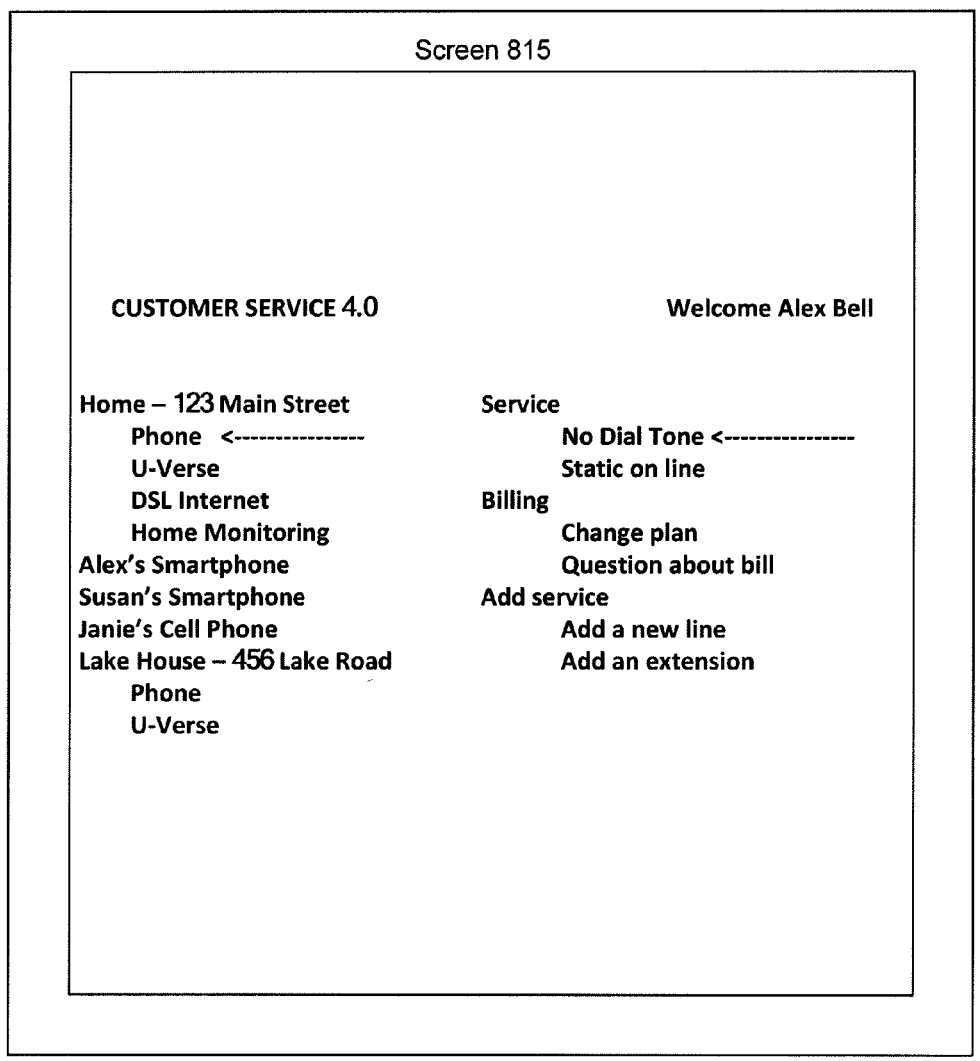
FIG. 9 shows the exemplary tablet and another screen for automating interactive transactions, according to an aspect of the present disclosure.

FIG. 9 shows the exemplary tablet and another screen 815 for automating interactive transactions, according to an aspect of the present disclosure. In the embodiment of FIG. 9, the screen 815 from FIG. 8 has been updated to show a submenu for "Phone" as selected in FIG. 8. The submenu includes a variety of selectable options that include "No Dial Tone" under a "Service" tab. The assistance application analyzes the content of the updated webpage on the screen 815, and selects a selectable option for "no dial tone".

Figure 10:
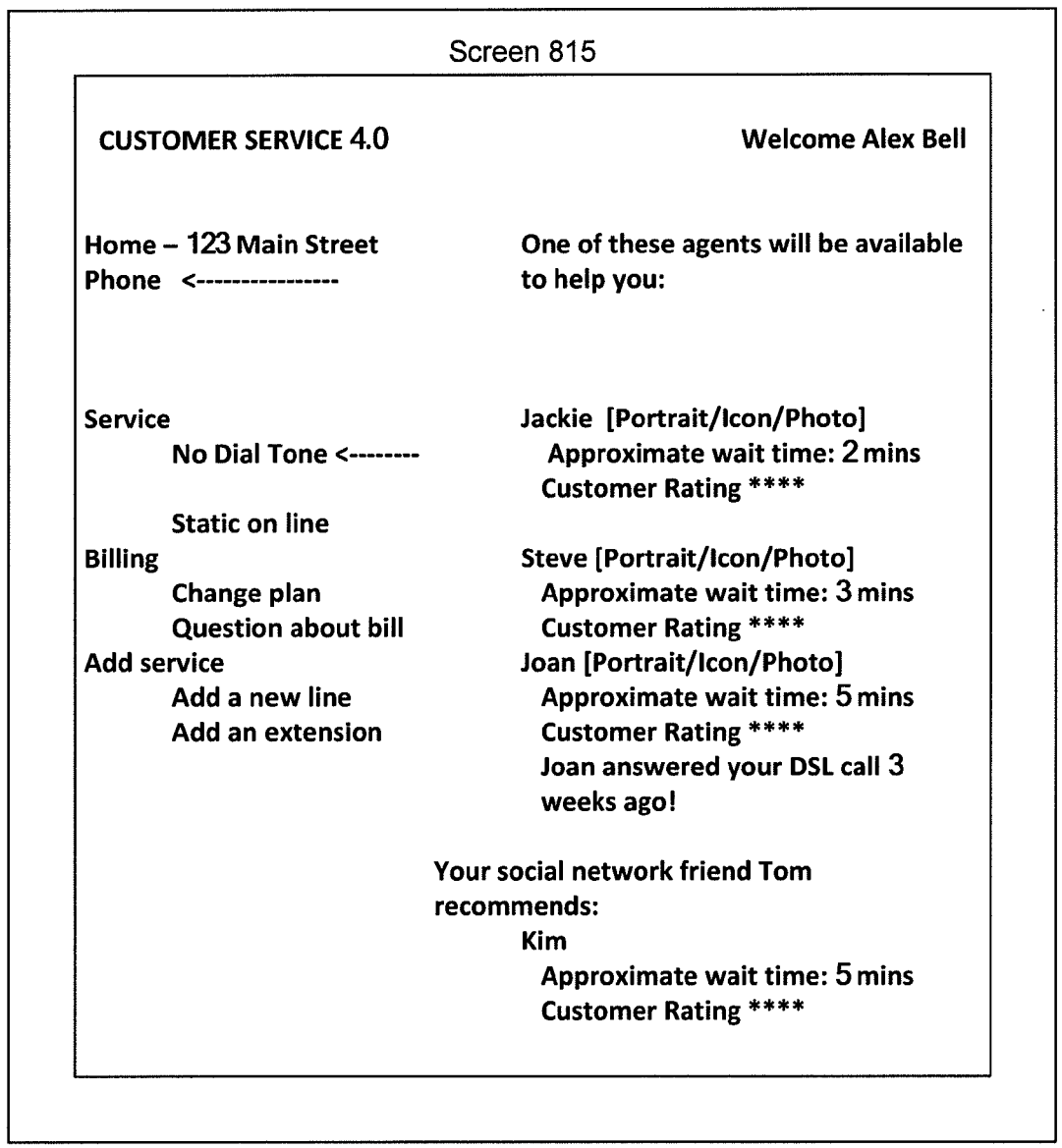
FIG. 10 shows the exemplary tablet and another screen for automating interactive transactions, according to an aspect of the present disclosure.

FIG. 10 shows the exemplary tablet and another screen for automating interactive transactions, according to an aspect of the present disclosure. In the embodiment of FIG. 10, the screen 815 from FIG. 9 has been updated to show the previous selections of "Phone" and "No Dial Tone" on the left, and to introduce options for agents to take care of the transaction request for the assistance application on the user device. The assistance application analyzes the content of the updated webpage on the screen 815 and selects an agent "Joan" because Joan answered a call for/from the same party 3 weeks prior for a "DSL" service.

FIG. 11 shows the exemplary tablet and another screen for automating interactive transactions, according to an aspect of the present disclosure. In the embodiment of FIG. 11, the screen 815 from FIG. 10 has been updated to show the previous selections of Phone and No Dial Tone. In FIG. 11, a chat session with "Joan" is initiated while the agent program coordinates a test of the phone line for which the communication was initiated, and reports the results of the test to the assistance program on the user device. The agent program also requests pre-approval for charges for handling a particular type of material problem inside a home if encountered once a technician is sent out.

In FIG. 11, an auto chat opening line is started by the agent program with the assistance program on the user device. Here, the auto chat agent program starts the chat with the statement "Mr. Bell—I'm happy to help you again—be with you shortly". In the embodiments described herein, the assistance program on the user device interacts with the agent program to complete a transaction or transaction proposal. Thus, the assistance program on the user device analyzes the statement from the agent program, and determines that no response is yet required. Once the agent or agent program sends another statement, the assistance program provides any requested information and interacts with the agent or agent program to complete the transaction.

Figure 12:
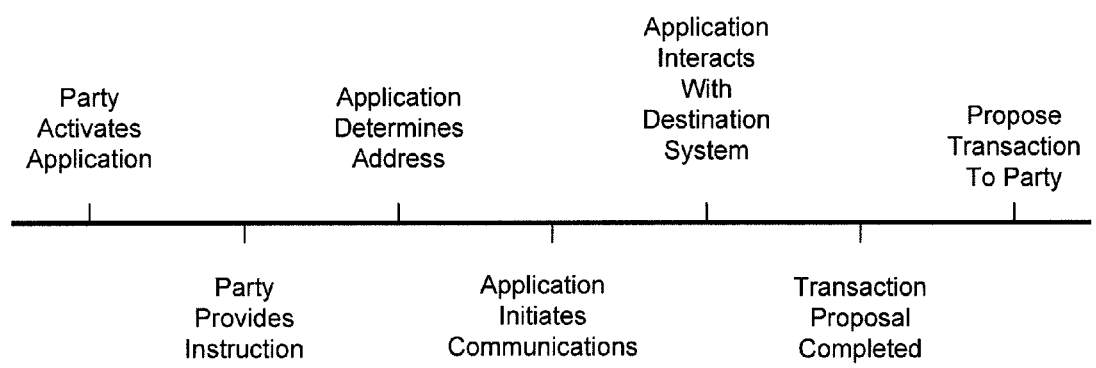
FIG. 12 shows an exemplary timeline for automating interactive transactions, according to an aspect of the present disclosure.

FIG. 12 shows an exemplary timeline for automating interactive transactions, according to an aspect of the present disclosure. In FIG. 12, the first action in the timeline is the party activating an application. The party may activate an application by, for example, touching an icon for the application on a smartphone or tablet computer. The next action in the timeline is the party providing instructions to the application, such as by providing a voice or text instruction of what transaction the party wishes to complete.

In the timeline of FIG. 12, the next activity is the application determining the address of a destination system. The application may determine the destination address based on a locally-stored transaction history that reflects previous similar transactions completed for the party. The application next initiates communications to the destination system, and interacts with the agent or agent program once communications are established. As set forth herein, communications may be by voice signals, text signals or other forms of data signals, or any other signals used to communicate over networks. Once the interactions result is a completed transaction proposal, the proposed transaction is provided to the party for approval.

In the embodiment of FIG. 12, the party activates an application and then need not monitor the application whatsoever, so that the next input required from the requesting party is authorization for a completed transaction proposal.

Interactive communications between two applications across a communications network may be carried out in a variety of ways. For example, an interactive voice response system provided to interact with humans may also interact with an assistance application that mimics a human on a user device. Such an assistance application may interpret voice instructions from the interactive voice response system and provide dual-tone multi-frequency tones in response so as to interact with the interactive voice response system. In other embodiments, assistance applications and agent applications may be provided with the intent to interact with each other rather than with humans. Such assistance applications may simply exchange data in an interaction, via audio tones or via ASCII characters in program languages.

As set forth herein, according to an aspect of the present disclosure, a method for intermediating communications with an automated system includes receiving, at an intermediating device that implements an intermediating communication application, an instruction to complete a transaction request on behalf of a user. The intermediating communication application on the intermediating device determines a destination system from which to request completion of the transaction request. The intermediating device interacts with the destination system to fulfill the transaction request.

According to another aspect of the present disclosure, the interaction by the intermediating device is independent of any interactive communications between a user of the intermediating device and the destination system.

According to yet another aspect of the present disclosure, the interactions with the destination system include exchanging data with the destination system.

According to still another aspect of the present disclosure, the method includes determining, by the intermediating device, an address of the destination system. The method also includes initiating a communication to the destination system at the address of the destination system.

According to another aspect of the present disclosure, the intermediating device initiates the communication only upon a user of the intermediating device logging in to the intermediating device and authorizing the intermediating communication application to initiate the communication.

According to yet another aspect of the present disclosure, the method includes communicating with a remote assistance system to complete the interaction with the destination system.

According to still another aspect of the present disclosure, the remote assistance system assists in determining the destination system for the communication.

According to another aspect of the present disclosure, the destination system is an interactive voice response system.

According to yet another aspect of the present disclosure, the intermediating device is a user communications device.

According to still another aspect of the present disclosure, the instruction is provided by voice of a user and interpreted by a speech recognition program on the user communications device.

According to another aspect of the present disclosure, the instruction is provided by text input of a user to the user communications device.

According to yet another aspect of the present disclosure, the instruction is to update an existing service subscribed to by the user.

According to still another aspect of the present disclosure, the instruction is to enroll the user in a new service.

According to another aspect of the present disclosure, the method includes updating an existing application on the intermediating device with data obtained during the interaction.

According to yet another aspect of the present disclosure, the existing application is a calendar application.

According to still another aspect of the present disclosure, the method includes providing a user of the intermediating device with a plurality of selectable options based on the interaction with the destination system.

According to another aspect of the present disclosure, the transaction request includes a payment authorization with preconfigured information.

According to yet another aspect of the present disclosure, the method includes communicating with a remote assistance system to complete the interaction with the destination system. The remote assistance system assists in determining the destination system for the communication.

According to an aspect of the present disclosure, a computer readable medium stores a set of executable instructions for intermediating communications with an automated system. The executable instructions, when executed by a processor, cause a computer to receive, at an intermediating device that implements an intermediating communication application, an instruction to complete a transaction request on behalf of a user. The intermediating communication application on the intermediating device determines a destination system from which to request completion of the transaction request. The intermediating device interacts with the destination system to fulfill the transaction request.

According to an aspect of the present disclosure, a computer platform executes executable instructions for intermediating communications with an automated system. The computer platform includes memory of an intermediating device and a processor of the intermediating device. The processor executes the executable instructions, and the instructions, when executed, cause the intermediating device to receive, at the intermediating device that implements an intermediating communication application, an instruction to complete a transaction request on behalf of a user. The intermediating communication application on the intermediating device determines a destination system from which to request completion of the transaction request. The intermediating device interacts with the destination system to fulfill the transaction request.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for intermediating network communications, by an intermediating device, between a user mobile phone having a near field chip and a destination computing system over a communication network, comprising:

logging into an intermediating communication application resident in the user mobile phone;

authenticating the logging into the intermediating communication application by receiving an authenticating password;

prepopulating information from the near field communication chip on the user mobile phone to the intermediating communication application on the user mobile phone;

authorizing the intermediating communication application in the user mobile phone device to initiate communication over the communication network;

initiating communication over the communication network with the intermediating device, wherein the initiating communications includes transmitting network profile data, including communication modes supported by the communication network and bandwidth capabilities of the communication network;

receiving, at the intermediating device, an instruction from the user mobile phone to complete a communication request on behalf of a user;

automatically analyzing, at the intermediating device, based on the communication request, information from previous communications involving the user by accessing information from the previous communications involving the user stored in a memory of the intermediating device;

automatically determining, by the intermediating device, a tentative destination system that will accept the communication request over the communication network based on analyzing the information from previous communications involving the user at the intermediating device stored in the memory of the intermediating device, and further based on an address of the-destination system stored in the memory of the intermediating device, wherein upon a determination of the tentative destination system, the intermediating device activates a dedicated assistance application on the user mobile phone in order to access profile data of the tentative destination, including destination systems that have been approved and/or disapproved by the user in previous communication requests, prior to the tentative destination system being approved as the destination system for completing the communication request;

communicating, by the intermediating device, with a remote assistance system separate from the approved destination system, when the address of the approved destination system is not stored in the memory of the intermediating device, in order to obtain the address of the approved destination system and complete interaction by the intermediating device with the approved destination system;

automatically initiating a communication over the communication network to the address of the approved destination system determined by the intermediating device, so as to request completion of the communication request;

interacting, by the intermediating device, with the approved destination system over the communication network by receiving at the intermediating device a request from the approved destination system, determining, by the intermediating device, a response to the request received from the approved destination system, and responding, by the intermediary device, to the request received from the approved destination system.

2. The method of claim 1,
wherein interaction by the intermediating device and the approved destination system is independent of any interactive communications between a user of the user device and the approved destination system.

3. The method of claim 1,
wherein interactions by the intermediating device with the approved destination system include exchanging data with the approved destination system.

4. The method of claim 1,
wherein the approved destination system is an interactive voice response system.

5. The method of claim 1,
wherein the instruction is provided by voice of a user and interpreted by a speech recognition program on the user mobile phone.

6. The method of claim 1,
wherein the instruction is provided by text input of a user to the user mobile phone.

7. The method of claim 1,
wherein the instruction is to update an existing service subscribed to by the user.

8. The method of claim 1,
wherein the instruction is to enroll the user in a new service.

9. The method of claim 1, further comprising:
updating the intermediating communication application resident on the user mobile phone with data obtained during the interaction.

10. The method of claim 9,
wherein the updating the intermediating communication application includes updating a calendar.

11. The method of claim 1, further comprising:
providing a user of the user mobile phone with a plurality of selectable options based on interaction by the intermediating device with the approved destination system.

12. The method of claim 1,
wherein the communication request includes an authorization to conduct a transaction with preconfigured information.

13. A non-transitory computer readable medium that stores a set of executable instructions for intermediating network communications, by an intermediating device, between a user mobile phone having a near field chip and a destination system over a communication network, the executable instructions, when executed by a processor, causing the computer to perform operations including:

logging into an intermediating communication application resident in the user mobile phone;

authenticating the logging into the intermediating communication application by receiving an authenticating password;

prepopulating information from the near field communication chip on the user mobile phone to the intermediating communication application on the user mobile phone;

authorizing the intermediating communication application in the user mobile phone device to initiate communication over the communication network;

initiating communication over the communication network with the intermediating device, wherein the initiating communications includes transmitting network profile data, including communication modes supported by the communication network and bandwidth capabilities of the communication network;

receiving, at the intermediating device, an instruction from the user mobile phone to complete a communication request on behalf of a user;

automatically analyzing, at the intermediating device, based on the communication request, information from previous communications involving the user by accessing information from the previous communications involving the user stored in a memory of the intermediating device;

automatically determining, by the intermediating device, a tentative destination system that will accept the communication request over the communication network based on analyzing the information from previous communications involving the user at the intermediating device stored in the memory of the intermediating device, and further based on an address of the destination system stored in the memory of the intermediating device, wherein upon a determination of the tentative destination system, the intermediating device activates a dedicated assistance application on the user mobile phone in order to access profile data of the tentative destination, including destination systems that have been approved and/or disapproved by the user in previous communication requests, prior to the tentative destination system being approved as the destination system for completing the communication request;

communicating, by the intermediating device, with a remote assistance system separate from the approved destination system, when the address of the approved destination system is not stored in the memory, in order to obtain the address of the approved destination system and complete interaction by the intermediating device with the approved destination system;

automatically initiating a communication over the communication network to the address of the approved destination system determined by the intermediating device, so as to request completion of the communication request;

interacting, by the intermediating device, with the approved destination system over the communication network by receiving at the intermediating device a request from the approved destination system, determining, by the user intermediating device, a response to the request received from the approved destination system, and responding, by the intermediating device, to the request received from the approved destination system.

14. The non-transitory computer readable medium of claim 13,
wherein interaction by the intermediating device and the approved destination system is independent of any interactive communications between a user of the user mobile phone and the approved destination system.

15. An intermediating device that executes executable instructions for intermediating network communications between a user mobile phone having a near field chip and a destination system over a communication network, the intermediating device comprising:

a memory; and
a processor,
wherein the processor executes the executable instructions, and the instructions, when executed, cause the intermediating device to perform operations including:

logging into an intermediating communication application resident in the user mobile phone;
authenticating the logging into the intermediating communication application by receiving an authenticating password;
prepopulating information from the near field communication chip on the user mobile phone to the intermediating communication application on the user mobile phone;
authorizing the intermediating communication application in the user mobile phone to initiate communication over the communication network;
receiving, at the intermediating device, an instruction from the user mobile phone to complete a communication request on behalf of a user;
automatically analyzing, at the intermediating device, based on the communication request, information from previous communications involving the user by accessing information from the previous communications involving the user stored in the memory of the intermediating device;
automatically determining, by the intermediating device, a tentative destination system that will accept the communication request over the communication network based on analyzing the information from previous communications involving the user at the intermediating device stored in the memory of the intermediating device, and further based on an address of the destination system stored in the memory of the intermediating device, wherein upon a determination of the tentative destination system, the intermediating device activates a dedicated assistance application on the user mobile phone in order to access profile data of the tentative destination, including destination systems that have been approved and/or disapproved by the user in previous communication requests, prior to the tentative destination system being approved as the destination system for completing the communication request;
communicating, by the intermediating device, with a remote assistance system separate from the approved destination system, when the address of the approved destination system is not stored in the memory of the intermediating device, in order to obtain the address of the approved destination system and complete interaction by the intermediating device with the approved destination system;
automatically initiating a communication over the communication network to the address of the approved destination system determined by the intermediating device, so as to request completion of the communication request;
interacting, by the intermediating device, with the approved destination system over the communication network by receiving at the intermediating device a request from the approved destination system,
determining, by the intermediating device, a response to the request received from the approved destination system, and
responding, by the intermediary device, to the request received from the approved destination system.

16. The intermediary device of claim 15,
wherein interaction by the intermediating device and the approved destination system is independent of any interactive communications between a user of the user device and the approved destination system.

* * * * *